UNITED STATES PATENT OFFICE.

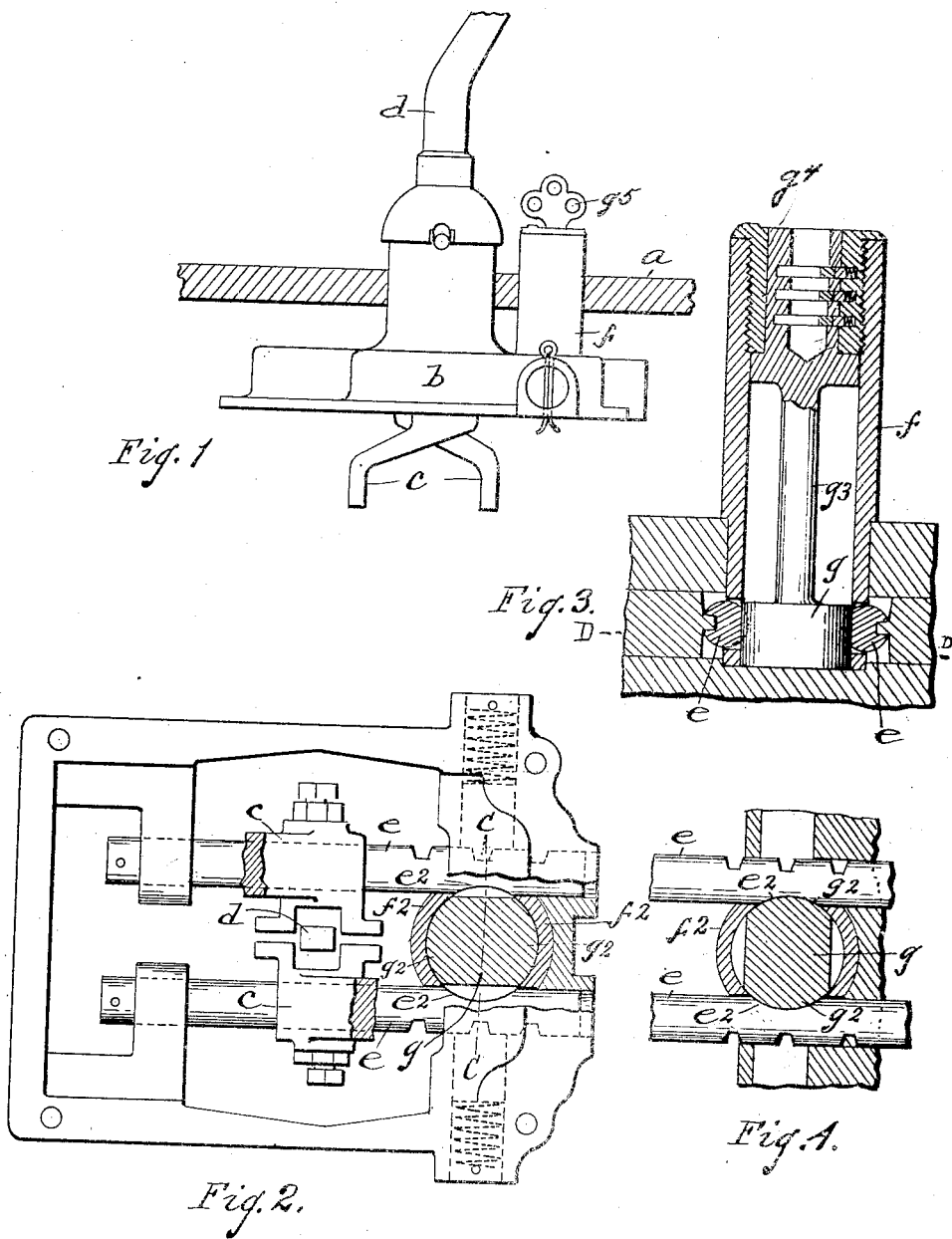

CHARLES G. TROSIEN, OF PONTIAC, MICHIGAN.

LOCK FOR AUTOMOBILES.

1,348,337.   Specification of Letters Patent.   Patented Aug. 3, 1920.

Application filed June 6, 1918. Serial No. 238,462.

*To all whom it may concern:*

Be it known that I, CHARLES G. TROSIEN, a citizen of the United States, residing at Pontiac, county of Oakland, State of Michigan, have invented a certain new and useful Improvement in Locks for Automobiles, and declare the following to be a full, clear, and exact description of the same, such as will enable others skilled in the art to which it pertains to make and use the same, reference being had to the accompanying drawings, which form a part of this specification.

My invention relates to locks for automobiles and an object of my improvements is to provide a simple and strong device for locking the gear-shifting rods of the transmission gearing in their neutral position.

I secure this object in the device illustrated in the accompanying drawings in which;

Figure 1 is a side elevation of an apparatus embodying my invention and so much of an automobile as is necessary to illustrate its connection therewith.

Fig. 2 is an inverted plan view, partly in section, of the apparatus shown in Fig. 1.

Fig. 3 is a detail section to an enlarged scale on the line C—C Fig. 2, the part $g$ being turned to its locking position.

Fig. 4 is a detail view showing a part of Fig. 2, the parts being in the locked position, the section being taken on the line D—D Fig. 3.

$a$ is a part of the floor of an automobile, $b$ is the upper part, or cover, of the change speed gear case, $c$ indicates the gear shifting forks and $d$ is the selective gear shifting lever. $e\ e$ are two parallel rods adapted to slide in bearings in the gear case $b$ and carrying the gear shifting forks $c$. $e^2\ e^2$ are two cavities cut in the adjacent sides of the rods $e\ e$ so as to be opposite each other when said rods are in neutral position. The cavities $e^2$ are formed with walls that are parts of the surface of a cylinder having its center or axis half way between said rods and perpendicular to the plane through the axes of rods $e\ e$.

$f$ is a cylindrical lock casing extending through the floor $a$ of the automobile and fitting into an aperture formed in the upper wall of the cover $b$ with its axis perpendicular to a plane through the center of the shifting rods $e$ and half way between said rods in their neutral position where they are cut out to form the cavities $e^2$. $g$ is a metal cylinder fitting and adapted to turn in the bore of the hollow cylinder $f$. The cylinder $f$ is cut away at its sides so that the rods $e$ shall pass into its bore or cavity at its lower end. The cylinder $g$ is cut away on its sides so that when turned with the cut away portions parallel to the rods $e$ as shown in Fig. 2 said rods may slide freely by the cylinder $g$. When the rods $e$ are in their neutral position and the cylinder $g$ is turned at right angles to the position shown in Fig. 2 the uncut away portions $g^2\ g^2$ of said cylinder will enter the cavities $e^2\ e^2$ in the rods $e\ e$ and thus lock said rods firmly in their neutral position. The cylinder $g$ has an upright $g^3$ rising from its center and there is a portion $g^4$ at the upper end of this upright fitting and adapted to turn in the bore of the cylinder $f$. There is a pin lock in the part $g^4$ which engages the wall of the cylinder $f$ to prevent the rotation of the cylinder $g$ and parts $g^3$ and $g^4$. A key $g^5$ may enter the upper end of the part $g^4$ and arrange the pins to permit the rotation of said part of the cylinder $g$.

When the cylinder $g$ is turned to the position shown in Fig. 4 in which the rods $e\ e$ are locked in their neutral position said cylinder is held in this position by the pin lock in the part $g^4$ so that the rods $e$ are locked in their neutral position against unauthorized manipulation. It will be noticed that the shifting rods $e\ e$ engage the rod $g$ at surfaces forming an acute angle with the longitudinal axes of said rods so that a force tending to move a rod $e$ will have little, or no, tendency to turn the rod $g$ or bring a strain upon the lock.

What I claim is:

In an apparatus of the kind described, a gear casing, two parallel rods adapted to reciprocate in said casing and to throw the mechanism in and out of engagement and provided with cavities on their adjacent sides, a lock casing perpendicular to the plane through the axes of said rods secured to the gear casing, an integral part adapted to rotate in said lock casing coaxial therewith, said part being formed to enter the cavities in said rods when turned to one angular position and to be withdrawn from said cavities when turned to another angular position, and means for engaging said part with said lock casing when turned to the position to enter said cavities, said lock casing extending to the lower end of said rotating part to support the same, and being cut away to permit the engagement of said part with said rods for the purpose described.

In testimony whereof I sign this specification.

CHARLES G. TROSIEN.